(12) United States Patent
Wang et al.

(10) Patent No.: US 6,657,726 B1
(45) Date of Patent: Dec. 2, 2003

(54) IN SITU MEASUREMENT OF SLURRY DISTRIBUTION

(75) Inventors: Yuchun Wang, San Jose, CA (US); Boguslaw Swedek, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 259 days.

(21) Appl. No.: 09/643,830

(22) Filed: Aug. 18, 2000

(51) Int. Cl.[7] .............................................. G01N 21/59
(52) U.S. Cl. ........................ 356/436; 356/246; 356/440
(58) Field of Search ................................ 356/246, 440, 356/342, 436, 601, 630, 632

(56) References Cited

U.S. PATENT DOCUMENTS

| | | | | |
|---|---|---|---|---|
| 3,876,629 A | * | 4/1975 | Lotzgesell | 536/106 |
| 4,748,329 A | * | 5/1988 | Cielo et al. | 356/632 |
| 4,835,134 A | * | 5/1989 | Umeda et al. | 503/210 |
| 5,185,644 A | * | 2/1993 | Shimoyama et al. | 356/632 |
| 5,289,267 A | * | 2/1994 | Busch et al. | 356/601 |

OTHER PUBLICATIONS

Article entitled "The influence of CMP Process Parameters on Slurry Transport" dated Feb. 11–12, 1999 by CMP–MIC Conference 1999 IMIC—400P/99/0037, pp. 37–44.

* cited by examiner

Primary Examiner—Richard A. Rosenberger
(74) Attorney, Agent, or Firm—Fish & Richardson

(57) ABSTRACT

A method and apparatus for measuring a slurry distribution. A slurry solution is doped with a light absorbing dye having an absorptivity sensitive to a physical parameter such as acidity, temperature or pressure. The solution is delivered between a platen and substrate in a first physical state where it absorbs light. A laser beam is generated, transmitted through the slurry layer, reflected off of the substrate, and detected by a photodetector. The thickness of the slurry is measured from its absorptivity and the transmittance of the laser beam. A relative motion between the light source and substrate allows the slurry layer thickness to be measured as a function of distance from the center of the substrate. A final water rinse removes the slurry and brings any residual slurry to a/second physical state where it does not absorb light.

18 Claims, 4 Drawing Sheets

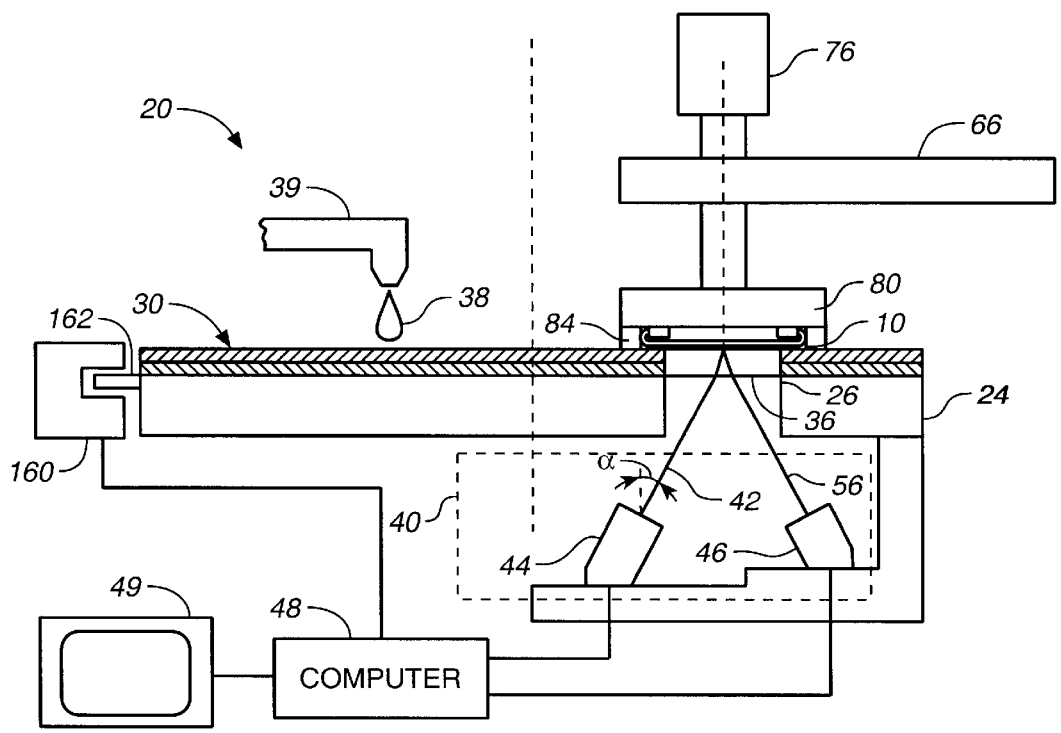
FIG._1
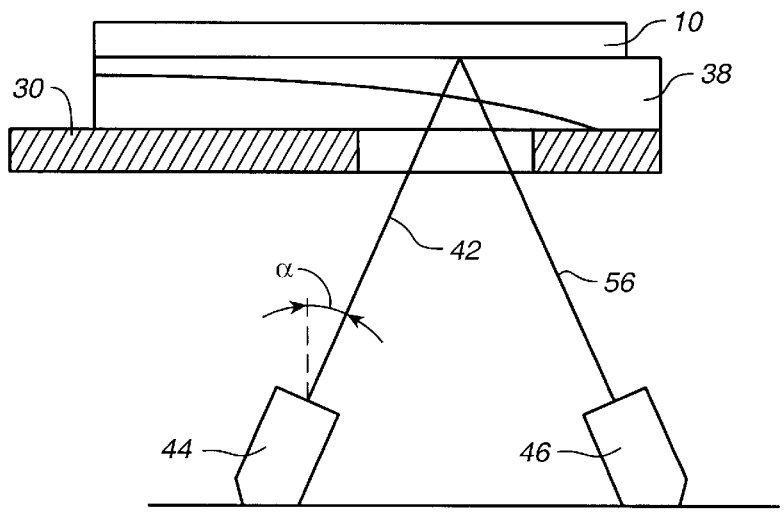
FIG._2

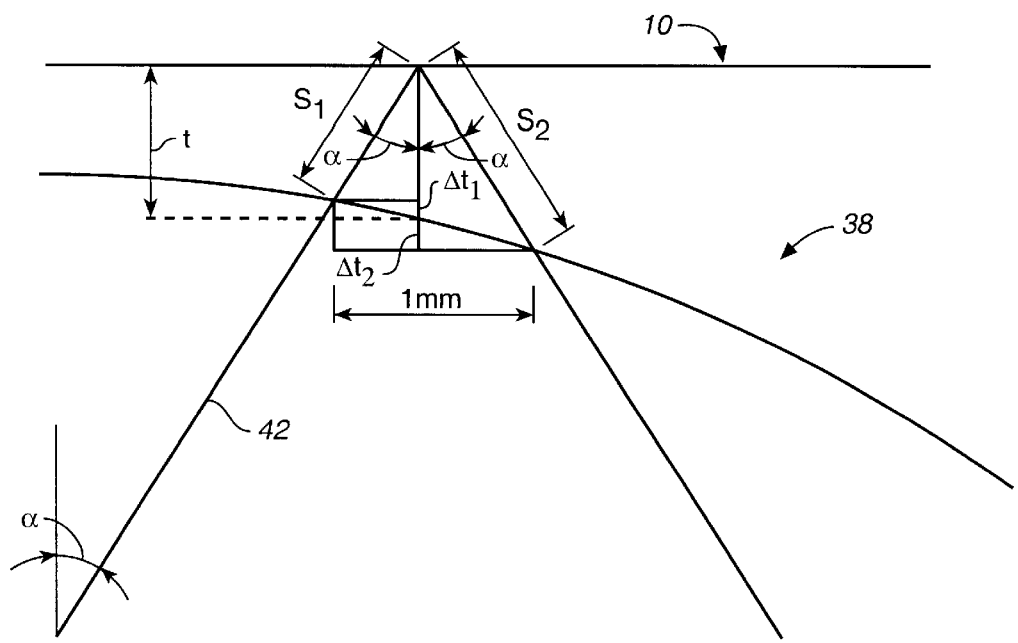
FIG._3
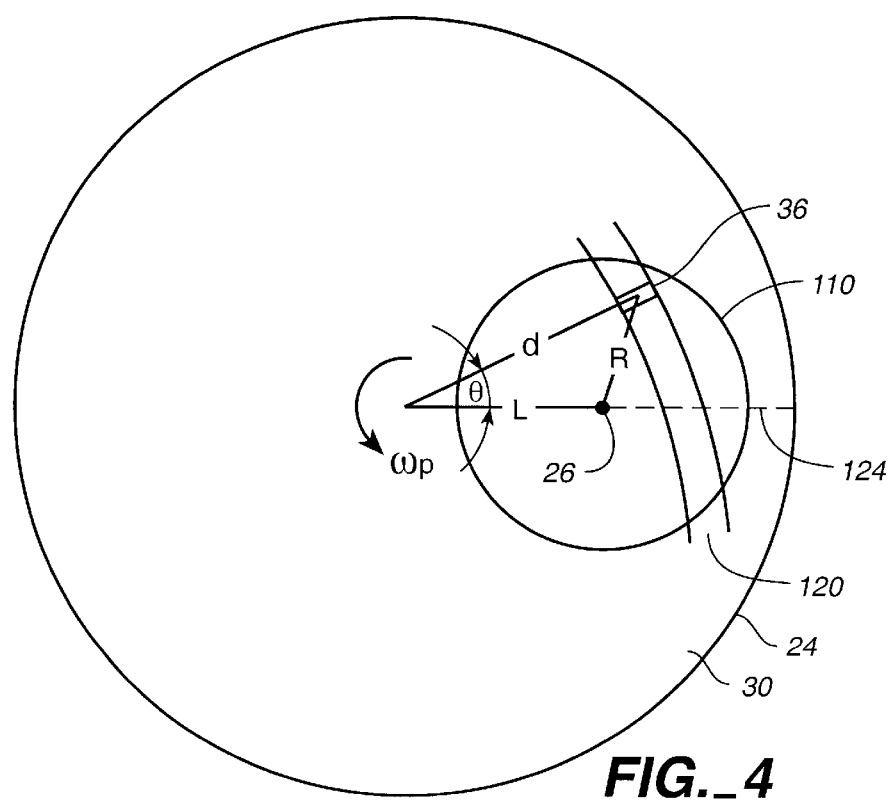
FIG._4

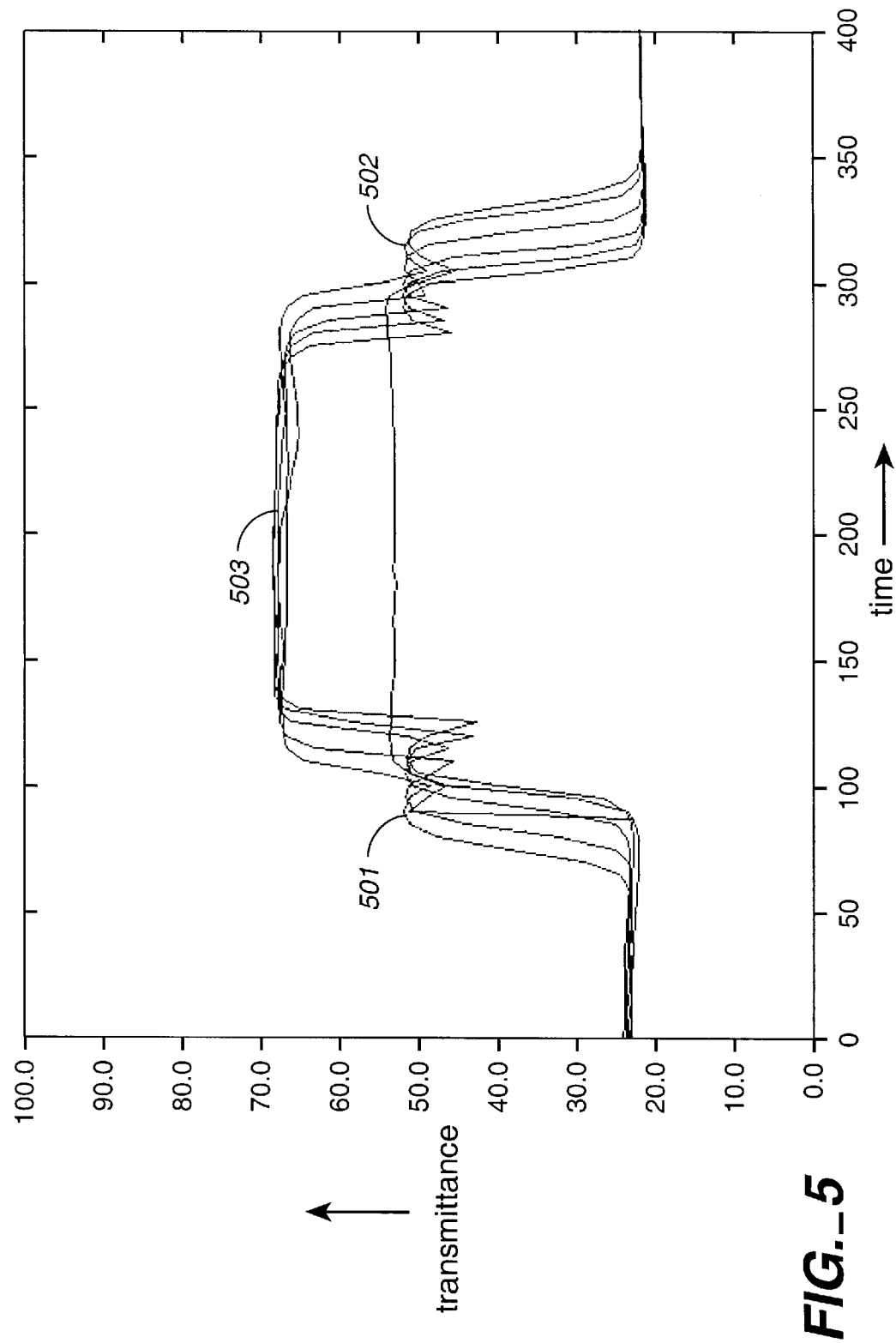
FIG._5

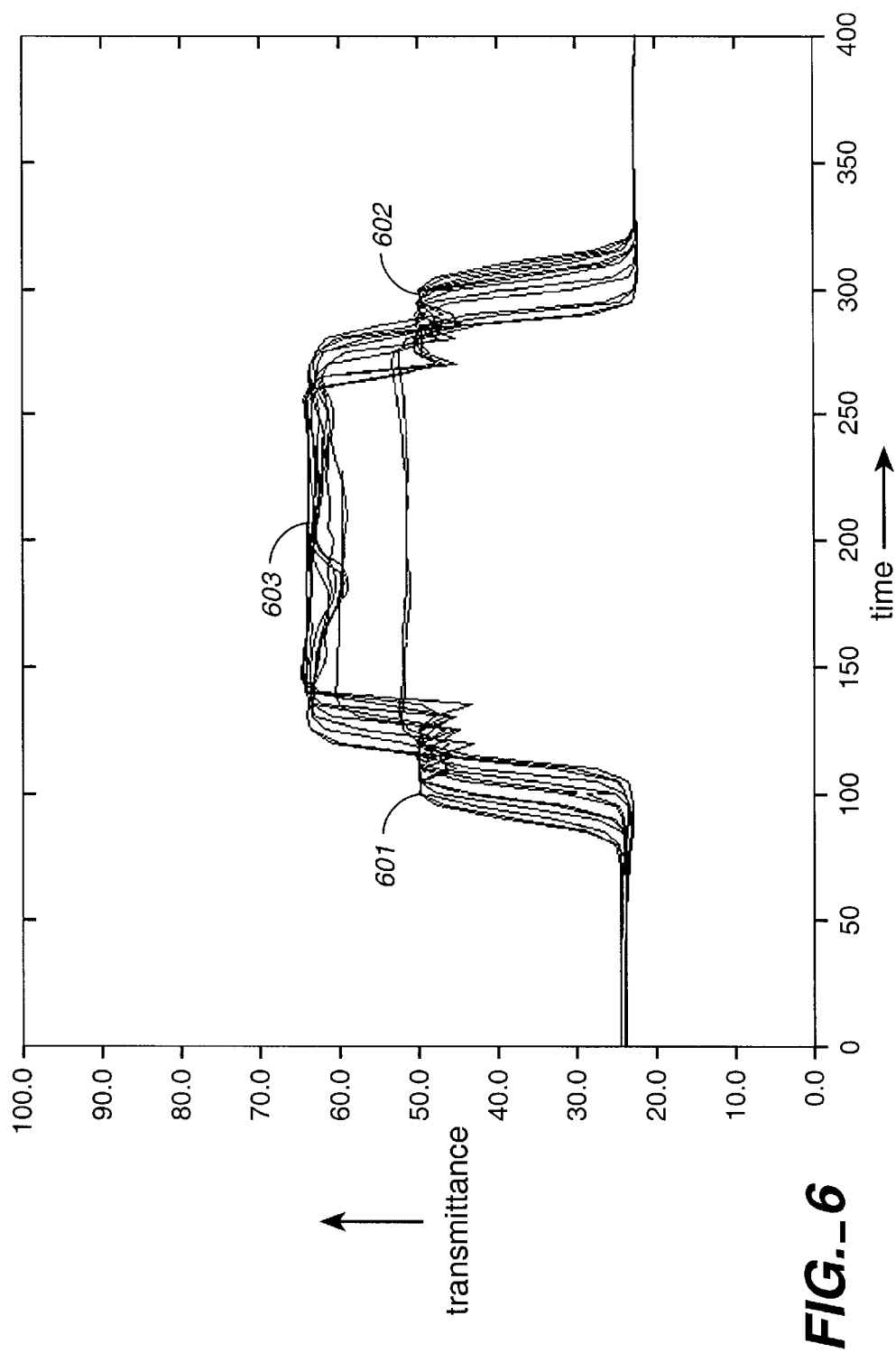
FIG._6

IN SITU MEASUREMENT OF SLURRY DISTRIBUTION

BACKGROUND

The present invention relates generally to chemical mechanical polishing of a substrate, and more particularly to a method and apparatus for measuring the distribution of a slurry layer delivered between a substrate and a polishing surface.

An integrated circuit is typically formed on a substrate by the sequential deposition of conductive, semi-conductive or insulating layers on a silicon wafer. One fabrication step involves depositing a filler layer over a patterned stop layer, and planarizing the filler layer until the stop layer is exposed. For example, a conductive filler layer may be deposited on a patterned insulating stop layer to fill the trenches or holes in the stop layer. After planarizing, the portions of the conductive layer remaining between the raised pattern of the insulating-layer form vias, plugs and lines that provide conductive paths between thin film circuits on the substrate.

Chemical mechanical polishing (CMP) is one accepted method of planarizing. The method typically requires that a substrate be mounted onto a carrier or polishing head, with the exposed surface of the substrate being placed against a rotating polishing platen or belt pad. The carrier head applies a controllable pressure upon the substrate, thereby forcing its exposed surface against the polishing platen. A polishing slurry, typically including both chemically-reactive agents and a suspension of abrasive particles, is supplied to the surface of the polishing platen and serves as a polishing agent.

Because of its active role as a polishing agent, the distribution and transport of slurry on polishing platens is known to be an important parameter affecting both substrate polishing rates and polishing uniformity. Despite this, few efforts have been made to study the distribution of slurry layers as a function of CMP process parameters such as the angular velocities of polishing heads and platens, polishing head pressure, slurry flow rates, and initial slurry distribution. Recently, studies on slurry distribution in CMP have been reported in the academic literature. However, the reported measurement techniques require the use of glass substrates and cannot be used to measure slurry distribution beneath silicon substrates. Additionally, some of the reported techniques require use of permanent dyes, such as methylene blue, which tend to stain polishing platens and heads after only a single use. These techniques are therefore undesirable for use with expensive, production quality CMP machines, despite the need to use such machines in the course of developing a product line.

SUMMARY

The invention comprises a method and apparatus for measuring the distribution of a slurry layer delivered between a platen and a substrate undergoing chemical mechanical polishing. The method involves doping a slurry solution with a light absorbing dye having an absorptivity which is sensitive to a physical parameter. In one implementation the absorptivity of the dye is sensitive to the acidity of the slurry. In another implementation, it is sensitive to temperature, and in a third implementation it is sensitive to pressure. The doped slurry is delivered to the surface of the platen and forms a layer between the platen and a substrate undergoing polishing.

A light source emits a beam of light which is transmitted through the slurry layer, reflected off of the substrate, and detected by a photodetector. The light source may emit the light at a predetermined intensity, or at a variable intensity which is measured. The intensity of the transmitted light is measured by the photodetector and the transmittance through the doped slurry layer is thereby determined. The thickness of the slurry layer may be determined from the transmittance, the absorptivity of the doped slurry solution, and a physical model of the slurry distribution. In one implementation, variations in the slurry layer thickness are small, and the thickness of the slurry layer is determined from the transmittance and the absorptivity.

The light source and substrate are in relative motion. This allows the thickness of the slurry layer to be determined as a function of both the radial and azimuthal position of the light source with respect to a fixed position on the substrate, taken to be its center. In one implementation, both the light source and the substrate are rotated around a central axis. In that implementation the slurry layer has no azimuthal angular dependency, and the slurry layer distribution is determined as a function of radial distance from the center of the substrate.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1 is a schematic side view of a chemical mechanical polishing apparatus including an optical reflectometer.

FIG. 2 is an illustration of an optical reflectometer used to determine a slurry distribution between a platen and a substrate undergoing chemical mechanical polishing.

FIG. 3 shows the path of a light beam through the slurry layer.

FIG. 4 is an illustration showing the sweep of a light beam from the optical reflectometer across the surface of a substrate being polished.

FIG. 5 shows a measured slurry layer distribution between a platen head and a substrate undergoing CMP parameter studies under a set of process parameters.

FIG. 6 shows a measured slurry layer distribution between a platen head and a substrate undergoing CMP parameter studies under an alternative set of process parameters.

Like reference symbols in the various drawings indicate like elements.

DETAILED DESCRIPTION

Referring to FIG. 1, a substrate 10 is polished by a CMP apparatus 20. A description of a similar polishing apparatus 20 may be found in U.S. Pat. No. 5,738,574, the entire disclosure of which is incorporated herein by reference. Polishing apparatus 20 includes a rotatable platen 24 on which is placed a polishing pad 30, and a carrier head system 76 including a rotatable and translatable carrier head 80.

A hole 26 is formed in platen 24 and a transparent window 36 is formed in a portion of polishing pad 30 overlying the hole. Transparent window 36 may be constructed as described in U.S. patent application Ser. No. 08/689,930, filed Aug. 26, 1996, the entire disclosure of which is incorporated herein by reference. Hole 26 and transparent window 36 are positioned such that they have a view of substrate 10 during a portion of platen 24's rotation, regardless of the translational position of carrier head 80.

Substrate 10 is mounted onto carrier head 80, which holds the surface of substrate 10 firmly against polishing pad 30 by applying an evenly distributed downward pressure across its back surface. A carrier head motor (not shown) rotates both carrier head 80 and substrate 10 about their central axis. A radial slot (not shown) formed in carousel support plate 66, allows both carrier head 80 and substrate 10 to undergo lateral motion across a portion of polishing pad 30. A description of suitable carrier heads 80 may be found in U.S. Pat. Nos. 6,183,354 and 6,422,927, the entire disclosures of which are incorporated by reference.

In operation, platen 24 is rotated about its central axis, and carrier head 80 is both rotated about its central axis and translated across the surface of polishing pad 30. A slurry layer 38 is supplied to the surface of polishing pad 30 by a slurry supply port or combined slurry/rinse arm 39. The slurry 38 may contain a chemically reactive catalyst, or a suspension of abrasive particles such as $SiO_2$, for polishing purposes. For oxide polishing, slurry 38 generally includes a reactive agent such as deionized water, a chemically-reactive catalyzer such as potassium hydroxide, and abrasive particles such as silicon dioxide. The abrasive particles are usually composed of silica grit having diameters in the neighborhood of 50 nm. The grit is formed by fuming and is then placed in a basic solution having a pH in the neighborhood of 10.5. For metal polishing, the grit may be formed from either silica or alumina. The slurry 38 also contains an absorptive dye which differentially absorbs light depending upon the physical state of the slurry.

An optical monitoring system 40, which can function as a reflectometer or interferometer, is secured to platen 24 generally beneath hole 26 and rotates with platen 24. The optical monitoring system includes a light source 44 and a photodetector 46. Light source 44 generates a light beam 42 at an angle α from the normal to the surface of platen 24. Light beam 42 propagates through transparent window 36 and a portion of slurry layer 38, reflects off of the exposed surface of substrate 10, propagates back through a different portion of slurry layer 38 and window 36, and is detected by photodetector 46.

Light source 44 may be a laser and light beam 42 may be a collimated laser beam. Laser 44 may operate continuously. Alternatively, light source 44 may only be activated to generate light beam 42 during a time when window 36 is generally adjacent substrate 10. For example, CMP apparatus 20 may include a position sensor 160 to sense when window 36 is near the substrate. Position sensor 160 could be an optical interrupter mounted at a fixed point opposite carrier head 80. A flag 162 may be attached to the periphery of platen 24 to interrupt position sensor 160 while window 36 is generally adjacent to substrate 10.

CMP apparatus 20 uses optical monitoring system 40 to determine the distribution of slurry layer 38 delivered by slurry/rinse arm 39. Optical monitoring system 40 allows for real time measurement of slurry distribution 38 between polishing pad 30 and a silicon substrate 10. Slurry distribution 38 can be measured while silicon substrate 10 is undergoing bona fide chemical mechanical polishing in apparatus 20. This is advantageous over reported methods for measuring slurry distribution 38 which rely on the use of glass substrates, and which would not work in conjunction with a silicon substrate 10.

In one implementation of optical monitoring system 40, laser 44, detector 46, and sensor 160 are connected to an oscilloscope to display the slurry distribution. In another implementation, laser 44, detector 46 and sensor 160 are connected to a general purpose processor 48. Processor 48 may be programmed to perform one or more of the following tasks: activate laser 44 when substrate 10 is generally adjacent to window 36, store intensity measurements from detector 46, display the intensity measurements on output device 49, sort the intensity measurements into radial ranges, and determine the distribution of slurry layer 38. Output device 49 may be a cathode ray tube, an ink plotter, a printer, an oscilloscope, a digital display, or other device capable of displaying information sent to it from processor 48.

Referring now to FIG. 2, light source 44 generates and emits light beam 42 so that the beam passes through window 36, doped slurry layer 38, and propagates toward the bottom surface of substrate 10. In one implementation, light source 44 is a laser light source and generates light beam 42 at a wavelength of 670 nm, an intensity of 4.5 milliwatts, and at an angle of approximately 16 degrees normal to the surface of platen 24. Other light sources and configurations, however, could be used for light source 44 and still be within the scope of the invention. For example, an alternative laser light source could be used to produce light at a different wavelength, or at a different intensity, or could be configured to emit light at a different angle normal to the surface of platen 24. Or an incandescent light source, with a known power spectrum per unit of solid angle, could be used to emit light beam 42. To obtain a desired spatial resolution, a light source is chosen which produces a light beam with a spot size smaller than the resolution desired.

Light beam 42 is refracted upon entering window 36, upon exiting window 36, and again upon entering slurry layer 38. Slurry layer 38 is doped with an absorptive dye which differentially absorbs light beam 42 depending upon the physical state of the slurry. In one implementation, the dye differentially absorbs light beam 42 such that it has a low absorptivity in a first physical state, and a high absorptivity in a second physical state. The dye is thoroughly mixed with slurry layer 38 so that it is uniformly distributed throughout the layer. In one implementation slurry 38 is doped with a pH sensitive dye, and differentially absorbs light beam 42 depending upon the pH of slurry 38. In another implementation, slurry 38 is doped with a temperature sensitive dye, and differentially absorbs light beam 42 depending upon the temperature of slurry 38. In yet another implementation, slurry 38 is doped with a pressure sensitive dye, and differentially absorbs light beam 42 depending upon the internal pressure of slurry 38.

Light beam 42 propagates through doped slurry layer 38 before reflecting off of the bottom surface of substrate 10 substantially in the direction of photodetector 46. Reflected light beam 42 continues propagating through doped slurry layer 38, is refracted upon exiting the layer, entering window 36, and again upon exiting window 36. Finally, reflected light beam 42 illuminates the surface of photodetector 46 where its intensity is measured.

The intensity of light beam 42 as measured at photodetector 46 is related to the intensity of light beam 42 as generated at source 44 by the well-known formula:

$$I_{46} = I_{44} \cdot e^{-\mu(x, c, \lambda) \cdot s} \quad \text{(Eq. 1)}$$

where: $I_{46}$ is the intensity of light beam 42 at photodetector 46; $I_{44}$ is the intensity of light beam 42 at source 44; $\mu(x, c, \lambda)$ is the absorptivity of doped slurry layer 38 as a function of physical variable x, wavelength λ, and concentration of absorptive dye, c; and s is the path length of light beam 42 through slurry layer 38. From Eq. 1, the path length of light beam 42 through slurry layer 38 is given by:

$$s = -\frac{1}{\mu(x, c, \lambda)} \ln(I_{46} / I_{44}) \quad \text{(Eq. 2)}$$

In one implementation, slurry 38 is chosen so that it does not significantly contribute to the absorptivity, $\mu(x, c, \lambda)$, under physical condition x at wavelength λ, and the absorptive dye is added to slurry 38 so that it obeys the well-known Beer-Lambert law. In this implementation, the absorptivity of slurry layer 38 can be rewritten as:

$$\mu(x, c, \lambda) =, \mu_{dye}(x, \lambda) \cdot c \quad \text{(Eq. 3)}$$

where $\mu_{dye}(x, \lambda)$ is the absorptivity of the dye as a function of physical variable x, and wavelength $\lambda$; and c is the concentration of the dye in the slurry. Other implementations are possible however, and remain within the scope of the invention. For example, in an alternative implementation slurry layer 38 does significantly contribute to its absorptivity. In another implementation, the absorptive dye is added to slurry layer 38 such that it does not obey the Beer-Lambert law.

In one implementation, slurry 38 is commercially available slurry SS-12, and x is the pH of SS-12. Slurry SS-12 has an intrinsic pH between 10 and 11. In other implementations, different slurries are used, and slurry 38 is brought to an appropriate pH, i.e. the pH where the absorptive dye strongly absorbs light beam 42, by addition of different acids or bases. For example, the pH of slurry 38 may be raised by addition of KOH, or may be lowered by addition of $HNO_3$. These, and other implementations are within the scope of the present invention.

In one implementation, the absorptive dye added to slurry 38 is thymolphthalein in the amount of 0.1 to 0.2 grams of thymolphthalein per liter of slurry. Thymolphthalein is a pH indicator which is substantially colorless and does not absorb red light when in a solution with pH$\leq$9, but turns blue and is highly absorptive of red light when in a solution with pH$\geq$10. In particular, thymolphthalein in a solution with pH$\geq$10 is highly absorptive of red laser light in the vicinity of 670 nm wavelength. Other implementations are possible, however, and still within the scope of the invention. For example, different amounts of thymolphthalein can be added to slurry 38.

In still other implementations, different absorptive dyes having different sensitivities to pH are used. For example, phenolphthalein may be used, and is colorless and does not substantially absorb blue light when in a solution with pH$\leq$8, but turns pink and is highly absorptive of blue light when in a solution with pH$\geq$9. Still other absorptive dyes can be used which are sensitive to different wavelengths of light, or to different physical properties of slurry layer 38 such as temperature or pressure. These implementations and others are within the scope of the invention.

Referring now to FIG. 3, the distribution of slurry layer 38 can be determined in part from its thickness, t, which is proportional to the path length s of light beam 42 through the layer. Referring to Eq. 2, the path length of light beam 42 through slurry layer 38 is measured by the transmittance of light beam 42 by the layer. Referring back to FIG. 3, the thickness t of slurry layer 38 can be determined from path length s, angle of incidence $\alpha$, and a model for the slurry distribution. From the figure, elemental geometry yields the following pair of equations:

$$t-\Delta t_1 = s_1 \cdot \cos(\alpha) \qquad (Eq. 4)$$

$$t+\Delta t_2 = s_2 \cdot \cos(\alpha) \qquad (Eq. 5)$$

Adding Eqs. 4 and 5, and rearranging algebraically yields:

$$2t \cdot \left(1 - \frac{\Delta t_1}{2t} + \frac{\Delta t_2}{2t}\right) = (s_1 + s_2) \cdot \cos(\alpha) = s \cdot \cos(\alpha) \qquad (Eq. 6)$$

In one implementation, the angle of incidence is chosen so that $\cos(\alpha) \sim 1$, and the variation of the thickness of slurry layer 38 over the path of light beam 42 through the layer is small, allowing for a slurry distribution model in which $\Delta t_1/t \sim \Delta t_2/t \sim 0$. In this implementation, the measured path length through slurry 38 reduces to:

$$t = s/2 \qquad (Eq. 7)$$

Referring now to FIG. 4, the combined rotation of platen 24, and the translational motion of carrier head 80 and substrate 10, causes window 36 and light beam 42 to sweep across the bottom surface of substrate 10 in path 120. As light beam 42 sweeps across the surface of substrate 10, optical monitoring system 40 measures the intensity of reflected beam 42. In one implementation, the intensity of reflected beam 42 is sampled at a sampling rate between 500 and 2000 Hz, and a number of intensity measurements, $I_1, I_2, \ldots, I_n$ are taken. Other implementations are possible and still within the scope of the invention. For example, the reflected intensity can be sampled at a higher sampling rate, at a lower sampling rate, or can be continually monitored. To obtain a desired spatial resolution, the sampling rate is chosen to be less than the product of the angular velocity of platen 24, the radius of substrate 10, and the inverse of the desired resolution.

To determine a distribution of slurry layer 38, each intensity measurement of reflected light beam 42 must be mapped to a radial position of the point of reflection from the center of substrate 10. In one implementation, the radial positions $R_i$ corresponding to reflected intensity measurements $I_i$ are determined from the times $t_i$ at which the intensity measurements are taken, the platen rotation rate $\omega_p$, and the carrier head sweep profile. A preferred method for determining the radial positions of intensity measurements $I_i$ is from a determination of the symmetry time $t_s$ at which laser beam 42 passes beneath a mid-line 124 of substrate 10. One method of determining the symmetry time $t_s$ is to average the times of the first and last large intensity measurements from a sweep, as these measurements correspond to reflections off of the leading and trailing edges of the substrate, respectively. Other methods of determining $t_s$ are possible, however, some of which are disclosed in U.S. patent application Ser. No. 09/460,529, filed Dec. 13, 1999, the entire disclosure of which is incorporated herein by reference.

Once symmetry time $t_s$ has been determined, the radial distances $R_i$ corresponding to intensity measurements $I_i$ taken at times $t_i$ can be calculated as:

$$R_i = \sqrt{d^2 + L_i^2 - 2dL_i\cos(\theta_i)} \qquad (Eq. 8)$$

where d is the distance between the center of polishing pad 30 and the center of window 36, $L_i$ is the distance from the center of polishing pad 30 to the center of substrate 10, and $\theta_i$ is the angular position of window 36 from center line 124 of substrate 10. The angular position of window 36 from center line 124 may be calculated as:

$$\theta_i = \omega_p \cdot (t_i - t_s) \qquad (Eq. 9)$$

where $\omega_p$ is the rotational rate of platen 24.

In one implementation, the distance $L_i$ between the center of polishing pad 30 and the center of substrate 10 is determined from the sweep profile of carrier head 80. To obtain a desired spatial resolution, the sweep profile of carrier head 80 is chosen so that the distance moved by substrate 10 between two measurement samples is less than the desired resolution. In one implementation, carrier head 80 moves in a sinusoidal pattern and the linear position $L_i$ of carrier head 80 and substrate 10 may be calculated as:

$$L_i = L_c + A_c \cdot \cos(\omega_c \cdot t_i) \qquad (Eq. 10)$$

where $\omega_c$ is the sweep frequency of carrier head 80, $A_c$ is the amplitude of the sweep, and $L_c$ is the center position of the carrier head sweep. In another implementation, the platen and carrier head positions are determined at the time of each measurement from optical encoders connected to the platen drive motor and radial drive motor, respectively. Still other implementations are possible, and within the scope of the claimed invention.

Having a mapping between intensity measurements of reflected light beam 42, and the times the intensity measurements are taken allows for a qualitative determination of the distribution of slurry layer 38 as a function of radial position from the center of substrate 10. Referring to Eq. 2, the transmittance of light beam 42 is a function of its path length s through slurry layer 38. The greater the path length of light beam 42 through slurry layer 38, the lower the transmittance. In one implementation, the intensity of light source 44 is constant. In that implementation, the intensity of reflected light beam 42 is similarly a function of its path length through slurry layer 38. Referring to Eq. 7, the path length of light beam 42 through slurry layer 38 is proportional to the thickness of slurry layer 38. Consequently, both the transmittance of light beam 42 and the intensity of reflected light beam 42 are a function of the thickness of slurry layer 38. Referring now to Eqs. 8–10, the time at which the intensity of reflected light beam 42 is measured is a function of the radial distance of the measurement from the center of substrate 10. Consequently, plots of both the intensity of reflected light beam 42 as a function of time, and the transmittance of light beam 42 as a function of time allow a qualitative determination of the distribution of slurry layer 38 as a function of radial position from the center of substrate 10.

Referring now to FIG. 5, a plot of the transmittance of light beam 42 as a function of time is shown under one set of process parameters. FIG. 5 exhibits the following features: two narrow reflectance peaks 501 and 502, on either side of a broad, flat transmittance peak 503. Reflectance peaks 501 and 502 indicate the reflection of light beam 42 off of the retaining ring assembly of carrier head 80. Transmittance peak 503 indicates the transmission of light beam 42 through slurry layer 38. The relatively uniform, flat nature of transmittance peak 503 indicates slurry layer 38 is distributed in a relatively uniform, even manner as a function of radial distance from the center of substrate 10 under the given set of process parameters.

Referring now to FIG. 6, a plot of the transmittance of light beam 42 as a function of time is shown under an alternative set of process parameters. FIG. 6 exhibits the following features: two narrow reflectance peaks 601 and 602, on either side of a broad, irregularly shaped transmittance peak 603. Reflectance peaks 601 and 602 indicate the reflection of light beam 42 off of the retaining ring assembly of carrier head 80. Transmittance peak 603 indicates the transmission of light beam 42 through layer 38. The irregular, non-uniform nature of transmittance peak 603 indicates slurry layer 38 is distributed in an irregular, non-uniform manner as a function of radial distance from the center of substrate 10 under the alternative set of process parameters.

Other implementations for determining the distribution of slurry layer 38 are possible, and still within the scope of the invention. For example, in one implementation, processor 48, is programmed to record data from light source 44, photodetector 46, and optical sensor 160, and to calculate parameters which are indicative of the thickness of slurry layer 38, and of the radial distance of the point of reflection of light beam 42 from the center of substrate 10. Such parameters include, but are not limited to, the distance from a point on the edge of substrate 10, the radial distance from the center of substrate 10, the measured time, the measured time less the symmetry time, the intensity of reflected light beam 42, the absorption of light beam 42, the transmission of light beam 42, the path length of light beam 42 through slurry layer 38, or the thickness of slurry layer 38. Any plot, table, or mapping of a variable which is indicative of the thickness of slurry layer 38 with a variable which is indicative of the distance of the point of reflection of light beam 42 from the center of substrate 10, will allow a qualitative, if not a quantitative determination of the distribution of slurry layer 38. These and other implementations are within the scope of the invention as set forth in the claims.

Referring once again to FIG. 1, once a slurry distribution has been determined, excess slurry is rinsed off of polishing pad 30 of CMP apparatus 20. In one implementation, the excess slurry is rinsed off with a high pressure water rinse delivered from combined slurry supply and rinse arm 39. In one implementation, the slurry dye is thymolphthalein and the slurry solution is at a pH>10. The water rinse removes excess slurry, and lowers the pH of the residual slurry/dye solution to a pH<9. At pH<9, the thymolphthalein does not substantially absorb light in the visible spectrum, and the residual slurry solution becomes clear. Other implementations are possible however, and the slurry solution can be brought to a different pH in order to render the slurry/dye solution colorless.

The ability to render the residual slurry solution on polishing pad 30 clear after determining the distribution of slurry layer 38 is advantageous over reported methods for measuring slurry layer 38, some of which rely on permanent dyes which tend to stain polishing pad 30. By rendering the residual slurry solution colorless, the present invention allows for repeated measurements of slurry layer 38 to be made without permanently staining polishing pad 30 or window 36. Similarly, the present invention allows for measurements of slurry layer 38 to be made on the same machine used for production level polishing, and even allows for interspersing measurements of slurry layer 38 with wafer production.

The invention has been described in terms of one or more implementations. Other implementations are possible, however, and still within the scope of the claimed invention.

What is claimed is:

1. A method to determine the distribution of a slurry layer delivered between a platen and a substrate, comprising:
    delivering a slurry solution in a layer between the platen and a substrate having a reflective surface, wherein the slurry solution contains a light absorbing dye;
    illuminating the substrate through the slurry layer by sweeping a beam of light across the substrate; and
    determining the distribution of the slurry layer from measurements of the intensity of light reflected off of the substrate.

2. The method of claim 1, further comprising calculating the thickness of the slurry layer as a function of the distance from the center of the substrate.

3. The method of claim 1, wherein the slurry solution is in a first physical state and contains a dye with a first absorptivity in a first physical state and a second absorptivity in a second physical state.

4. The method of claim 3, further comprising adding a solute to the slurry solution to bring the solution to a second physical state.

5. The method of claim 3, further comprising adding a solvent to the slurry solution to bring the solution to a second physical state.

6. The method of claim 5, wherein the solvent is water.

7. The method of claim 3, wherein a slurry solution in a first physical state comprises a slurry solution with a pH at a first level, and a slurry solution in a second physical state comprises a slurry solution with a pH at a second level.

8. The method of claim 7, wherein the dye is thymolphthalein.

9. The method of claim 8, wherein a slurry solution in a first physical state has a pH approximately greater than 10, and a slurry solution in a second physical state has a pH approximately less then 9.

10. The method of claim 1, further comprising:
    selecting a dye responsive to light with a first absorptivity in a slurry solution in a first physical state and a second absorptivity in a slurry solution in a second physical state; and doping a slurry solution in a first physical state with the dye.

11. A slurry solution, comprising:

an oxidizing agent;

a dye having an absorptivity to light which varies in response to changes in the physical state of the slurry solution; and a suspension of abrasive particles for polishing a substrate in a chemical mechanical polishing operation.

12. The slurry solution of claim 11, wherein the dye has an absorptivity which varies in response to changes in the pH of the slurry solution.

13. The slurry solution of claim 12, wherein the dye is thymolphthalein.

14. The slurry solution of claim 11, wherein the suspension of abrasive particles comprises a suspension of silica particles.

15. The slurry solution of claim 11, wherein the suspension of abrasive particles comprises a suspension of alumina particles.

16. An apparatus for measuring the distribution of a slurry layer delivered between a platen and a substrate, comprising:

a platen having a transparent region;

a carrier head for carrying a substrate having a surface to be polished;

a first motor for generating a relative motion between the platen and the carrier head;

a light source for illuminating the substrate surface through the transparent region of the platen and the slurry layer;

a photodetector for measuring the intensity of light reflected off of the substrate surface;

a display device; and a processor configured to determine the slurry distribution from the intensity of the illuminating and reflected light.

17. The apparatus of claim 16, further comprising a second motor for generating a relative sweeping motion between the light source and the illuminated surface of the substrate.

18. The apparatus of claim 17, wherein the first and second motors are the same motor.

* * * * *